United States Patent [19]

Hill, Jr. et al.

[11] 3,859,388

[45] Jan. 7, 1975

[54] PREPARATION OF NITRILE POLYMERS WITH ARALKYL MERCAPTANS AS POLYMERIZATION MODIFIERS

[75] Inventors: H. Wayne Hill, Jr.; Charles W. Moberly, both of Bartlesville, Okla.

[73] Assignee: Phillips Petroleum Company, Bartlesville, Okla.

[22] Filed: July 12, 1973

[21] Appl. No.: 378,629

[52] U.S. Cl.......... 260/879, 260/79.5 C, 260/880 R, 260/880 B
[51] Int. Cl..... C08f 15/22, C08f 19/18, C08f 15/38
[58] Field of Search.......... 260/79.5 C, 879, 880 R, 260/880 B

[56] References Cited
UNITED STATES PATENTS
3,562,359  2/1971  Gelman............................. 260/879
3,763,278  10/1973  Griffith ........................... 260/880 R Primary Examiner—Joseph L. Schofer
Assistant Examiner—William F. Hamrock

[57] ABSTRACT

Aralkyl mercaptans are effective polymerization molecular weight modifiers for solution polymerization processes in the preparation of nitrile polymers in which polymerizable nitrile monomer, optionally with a vinylidene group-containing or substituted vinylidene group-containing monomer copolymerizable therewith, is graft polymerized in the presence of a free radical polymerization catalyst and a rubbery polymer.

21 Claims, No Drawings

PREPARATION OF NITRILE POLYMERS WITH ARALKYL MERCAPTANS AS POLYMERIZATION MODIFIERS

FIELD OF THE INVENTION

This invention relates to graft polymerization systems employing a polymerization molecular weight modifier or chain regulator.

BACKGROUND OF THE INVENTION

In solution graft polymerization processes employing a rubbery polymer, a free radical polymerization catalyst, and a polymerizable vinylidene group containing monomer, molecular weight modifiers or polymerization modifiers or chain transfer regulators are employed. The most common types of modifiers have been various aliphatic or aromatic mercaptans. The modifier is employed to control the length of the homopolymer and graft polymer chains, and generally tends to enhance the melt flow of the resulting polymeric product.

However, in preparing nitrile polymers, attaining the desired molecular weight frequently has been accompanied by undesirable decreases in other properties such as toughness, impact strength, and the like. Mere employment of larger quantities of mercaptan has not provided a suitable answer, and often has been accompanied by other problems such as residual "sulfur" odour in the polymeric product.

Improved chain regulators have been needed in the polymerization arts.

OBJECTS OF THE INVENTION

It is an object of the invention to provide improved polymerization processes for preparation of high nitrile polymers.

Other aspects, objects, and the several advantages of our invention will be apparent to one skilled in the art from the following disclosure and our appended claims.

BRIEF SUMMARY OF THE INVENTION

We have discovered that aralkyl mercaptans are unusually effective as polymerization molecular weight modifiers or chain regulators in the preparation of nitrile polymers by solution graft polymerization processes employing a polymerizable nitrile, optionally with a second vinylidene group-containing or substituted vinylidene group-containing monomer copolymerizable therewith, in the presence of a free radical polymerization catalyst and a rubbery polymer.

The aralkyl mercaptans exhibit an unexpectedly pronounced degree of effectiveness as compared to the usual aliphatic or aryl mercaptans, providing nitrile polymers of desirably high melt flow at moderate chain regulator usage. The aralkyl mercaptan modifiers employed in the process of this invention serve to improve the melt flow of the polymers produced, thereby providing polymers of improved processibility.

DETAILED DESCRIPTION OF THE INVENTION

Aralkyl mercaptans are employed as molecular weight regulators in solution graft polymerization processes for the preparation of nitrile polymers. In our process, an unsaturated rubbery polymer is used as a base polymer, and to this is grafted a polymerizable nitrile, optionally with a second vinylidene group-containing or substituted vinylidene group-containing copolymerizable monomer, employing a free radical polymerization catalyst in a solution polymerization process.

In solution polymerization, the rubber base polymer and polymerizable monomer or monomers including at least one polymerizable nitrile monomer are placed in solution in a suitable liquid such that they are completely dissolved in solvent under the reaction conditions. The resulting graft polymer itself may be either soluble or insoluble in the solvent. Polymerization processes employing the modifiers according to our process may be either continuous or batch, with monomers added as a batch or in a continuous or intermittent fashion in whole or in part depending on the particular type of polymeric product desired.

With respect to the nitrile polymers produced by the process of this invention, we prefer that about 18 to 95 weight percent, preferably about 18 to 85 weight percent, more preferably about 20 to 70 weight percent, of the polymer be derived from the polymerizable nitrile monomer, about 5 to 50 weight percent, preferably about 7 to 30 weight percent, of the polymer be derived from the unsaturated rubber employed; and from 0 to about 75 weight percent, preferably about 4 to 70 weight percent, be derived from the olefinically unsaturated monomer copolymerizable with the polymerizable nitrile. To produce nitrile polymers having compositions as indicated above, the monomer or monomers and the rubber thus are employed in ratios within the above ranges.

Aralkyl Mercaptans

The aralkyl mercaptans effective for producing high nitrile polymers in a solution polymerization process according to our invention are characterized as hydrocarbyl aralkyl mercaptans containing one benzene nucleus as the aromatic ring. The aralkyl mercaptans can be represented by the formula

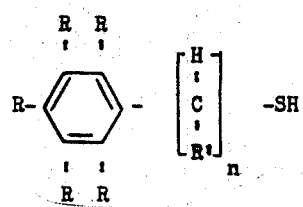

in which each R is hydrogen or is a hydrocarbyl radical including alkyl, or cycloalkyl such as cyclopentyl or cyclohexyl, with the proviso that at least four of the R groups be hydrogen; R' is hydrogen, or is methyl or ethyl; and $n$ is an integer and is 1 or 2. There is no carbon atom restriction on the size of the R groups when alkyl, except convenience and availability, with radicals of 1 to 6 carbon atoms presently preferred.

Aralkyl mercaptans include as exemplary benzyl mercaptan, 2-phenylethyl mercaptan, 2-phenylpropyl mercaptan, 1-methyl-2-o-tolylbutyl mercaptan, 3-ethylbenzyl mercaptan, 4-isopropylbenzyl mercaptan, 1-(2-butylphenyl)ethyl mercaptan, 1-ethyl-2-(4-hexylphenyl)butyl mercaptan, 3-cyclohexylbenzyl mercaptan, 2-(4-cyclopentylphenyl)ethyl mercaptan, and the like, and mixtures thereof.

Elastomer

The elastomer or rubber employed in the solution polymerization process of our invention can be any synthetic or natural rubber characterized as have sufficient unsaturation as to be vulcanizable, i.e., the unsaturation provides sites for graft polymerization. The unsaturated elastomers include both natural and synthetic polymers. Presently preferred for versatility are the synthetic materials of random, block, branched block type, homopolymer, copolymers, one or more, or mixtures.

The synthetic elastomers include polymers of polymerizable conjugated dienes, such as from those containing 4 to 12 carbon atoms per molecule, such as 1,3-butadiene, isoprene, piperylene, 2,4-dimethyl-1,3-butadiene, 1,3-octadiene, 4,5-diethyl-1,3-octadiene, and the like polymerized to form homopolymers or copolymerized one with another. The conjugated diene polymers include copolymers formed by polymerization of one or more polymerizable conjugated dienes with one or more copolymerizable monovinyl-substituted aromatic compounds, such as those of 8 to 20, more particularly for commercial availability 8 to 12, carbon atoms per molecule, including the presently preferred styrene, as well as various of the alkyl styrenes such as ethyl styrene, halostyrenes such as 2,3-dichlorostyrene, or other copolymerizable monovinyl-substituted aromatic compounds. Copolymers of one or more polymerizable conjugated dienes with one or more polymerizable alpha, betaolefinically unsaturated nitriles, such as acrylonitrile or methacrylonitrile, can be employed. Rubbery copolymers of one or more polymerizable conjugated dienes with one or more 1-monoolefins of 2 to 8 carbon atoms per molecule such as ethylene, propylene, 1-octene, and the like, also can be employed.

Exemplary unsaturated elastomers include cis-polybutadiene, emulsion polybutadiene, vinyl polybutadiene, cis-polyisoprene, natural rubber, GRS rubbers, butadiene/styrene copolymers, butadiene/acrylonitrile copolymers, ethylene/propylene/conjugated diene terpolymers, partially hydrogenated polybutadiene or butadiene/styrene copolymers, and various of the branched block copolymers prepared with polyvinyl or divinyl-substituted aromatic hydrocarbons, or with other polyfunctional branching agents such as the silicon polychloride as are known to the arts in the preparation of rubbery polymers.

Polymerizable Nitriles

Polymerizable nitriles include the alpha, beta-olefinically unsaturated nitriles. Alpha, beta-olefinically unsaturated nitriles can be represented by:

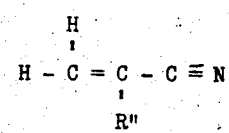

in which R'' can be hydrogen, or can be a lower alkyl group, preferably of 1 to 4 carbon atoms, or can be a halogen and when halogen can be fluorine, chlorine, bromine, or iodine. These polymerizable nitriles include such as acrylonitrile, methacrylonitrile, α-chloroacrylonitrile, α-fluoroacrylonitrile, ethacrylonitrile, butacrylonitrile, and the like, alone or in admixture. Presently preferred are acrylonitrile and methacrylonitrile, one or other alone, or mixtures.

Optional Comonomer

The olefinically unsaturated comonomer which can be employed, if desired, with the polymerizable nitrile, include any of the copolymerizable vinylidene group-containing or substituted vinylidene group-containing monomers copolymerizable with the polymerizable nitrile in the presence of an unsaturated rubber. Preferably, these vinylidene group- or substituted vinylidene group-containing monomers contain 2 to 16 carbon atoms, due in part to greater availability. These compounds can be represented by:

$$R^3-C(H)=C(R^4)-R^5$$

in which $R^3$ represents hydrogen or

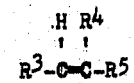

$R^4$ represents hydrogen, methyl,

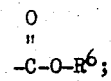

or chlorine; $R^5$ represents aryl, such as phenyl, biphenyl, or naphthyl, alkaryl such as tolyl,

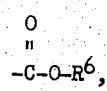

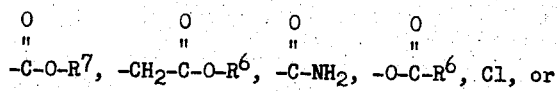

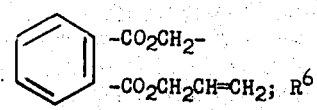

$R^6$ represents an alkyl radical of 1 to 4 carbon atoms; and $R^7$ represents hydrogen, or an alkyl radical of 1 to 12 carbon atoms which can be further substituted with a cyano group.

Examples of vinylidene group- or substituted vinylidene group-containing monomers include styrene, α-methylstyrene, α,p-dimethylstyrene, 4-vinylbiphenyl, and 2-vinylnaphthalene; acrylate esters such as methyl acrylate, ethyl acrylate, isopropyl acrylate, butyl acrylate, octyl acrylate, dodecyl acrylate, and β-cyanoethyl acrylate; methacrylate esters such as methyl methacrylate, ethyl methacrylate, butyl methacrylate, hexyl methacrylate, octyl methacrylate, dodecyl methacrylate, and β-cyanoethyl methacrylate; acrylic acid; methacrylic acid; itaconate esters such as dimethyl itaconate, diethyl itaconate, and dibutyl itaconate; fumarate and maleate esters such as dimethyl fumarate, dimethyl maleate, diethyl fumarate, diethyl maleate, dibutyl fumarate, and dibutyl maleate; acrylamide; methacrylamide; vinyl esters such as vinyl acetate, vinyl propionate, and vinyl butyrate; vinyl chlorode; vinylidene chloride; diallyl phthalate; and the like; and mixtures thereof.

Polymerization Process

The solution polymerization process of this invention employs a free radical initiator, e.g., of the azo, peroxy, or redox types, such as azobisisobutyronitrile, benzoyl peroxide, isopropyl peroxydicarbonate, di-(tert-butylcyclohexyl) peroxydicarbonate, potassium persulfate, potassium persulfate-sodium bisulfite, and the like. Oil-soluble initiators are preferred for use in solution polymerization systems. Although the amount of initiator can be varied over a wide range, the initiator generally is employed in an amount of about 0.01 to about 10, preferably about 0.05 to about 5, phm, parts by weight per 100 parts by weight of monomer(s).

The temperature at which the polymerization is conducted can vary over a considerable range. Expedient temperatures would fall within the range of about 0° C. to 100° C., preferably about 30° C. to 80° C. The polymerization time also can vary over a considerable range, depending in part on the polymerization temperature, and other factors, but characteristically would be within the range of a few minutes such as about 30 minutes to many hours such as about 48 hours or more, preferably about 10 hours to 30 hours. The pressure need be only sufficient to maintain the monomers and solvent or diluent substantially in the liquid phase, such as about 0 psig to 50 psig or more. Solvents inert to the reactants include such as the saturated aliphatic, saturated cycloaliphatic, and aromatic hydrocarbons such as cyclohexane, methylcyclohexane, methylcyclopentane, hexane, heptane, 2,2,4-trimethylpentane, 2,2-dimethylbutane, benzene, toluene, and xylenes, and ethers such as tetrahydrofuran and dioxane. Mixtures of such solvents can be employed.

EXAMPLES

Examples supplied, particular species employed, amounts, particular modes of polymerization, are intended to further illustrate the invention, and not be limitative of the reasonable and proper scope of our invention in accordance with our disclosure.

Example I

Various mercaptans were evaluated as modifiers in the copolymerization of styrene and acrylonitrile in the presence of a hydrocarbon solution of a butadiene/styrene block copolymer. The polymerization reactions were conducted in containers sealed with rubber gaskets and perforated crown caps.

A solution of Solprene (Phillips Petroleum Company Trademark) 1205 rubber (75/25 weight ratio butadiene/styrene block copolymer with a Mooney viscosity of 47 ML-4 at 212° F. according to ASTM D 1646-63) was prepared by adding the rubber and cyclohexane as solvent to a container, flushing with nitrogen, and warming and agitating the contents. To this solution was added the styrene and acrylonitrile monomers, the peroxy initiator, and the mercaptan modifier. The charge was as follows:

| Component | phm[a] |
|---|---|
| Solprene 1205 rubber | 15 or 20 |
| Cyclohexane | 468[b] |
| Styrene | 75 |
| Acrylonitrile | 25 |
| Initiator[c] | 2 to 4 |
| Mercaptan | Variable |

[a]phm = parts by weight per hundred parts monomer.
[b]Except when tert-dodecyl mercaptan was used in which case 312 phm cyclohexane was employed.
[c]Benzoyl peroxide, or di-(tert-butylcyclohexyl) peroxydicarbonate.

The charged sealed containers were tumbled end over end in a hot water bath for 22 hours at 70° C, after which the containers were removed and the contents, which had the appearance of latex, were coagulated in methanol and further washed twice in methanol. The recovered solid polymer was dried in vacuum at 65° C for several hours using a nitrogen flush in the vacuum oven. The melt flow of the dried polymer was determined at 200° C using a 5-kilogram weight by the method of ASTM D 1238-70, Condition G. The melt flow values of the polymers produced through use of the various mercaptans and the yields of polymers, including rubber charged, are summarized in Table I.

TABLE I

| Run | Mercaptan Modifier | phm | Melt Flow, g/10 min. | Yield of Polymer, wt. % |
|---|---|---|---|---|
| | 20 phm Solprene 1205 Rubber - Benzoyl Peroxide Initiation | | | |
| 1 | Benzyl mercaptan | 1 | 5.13 | 89 |
| 2 | 2-Phenylethyl mercaptan | 1 | 5.13 | 87 |
| 3 | 2-Phenylethyl mercaptan | 2 | 173 | 72 |
| 4 | tert-Dodecyl mercaptan | 1 | 0.09 | 90 |
| 5 | n-Dodecyl mercaptan | 1 | 1.46 | 83 |
| 6 | n-Dodecyl mercaptan | 2 | 14.02 | 83 |
| | 15 phm Solprene 1205 Rubber - Benzoyl Peroxide Initiation | | | |
| 7 | Benzyl mercaptan | 1 | 24.76 | 88 |
| 8 | n-Dodecyl mercaptan | 1 | 1.76 | 87 |
| 9 | tert-Octyl mercaptan | 1 | 0.09 | 84 |
| 10 | Thiophenol | 1 | 0.18 | 88 |
| 11 | p-Toluenethiol | 1 | 0.06 | 85 |
| 12 | 2-Napthalenethiol | 1 | 0.02 | 86 |
| 13 | Benzyl mercaptan | 2 | 98.86 | 77 |
| 14 | n-Dodecyl mercaptan | 2 | 17.09 | 83 |
| 15 | tert-Octyl mercaptan | 2 | 2.79 | 82 |
| 16 | Thiophenol | 2 | 0.25 | 78 |
| 17 | p-Toluenethiol | 2 | 0.1 | 76 |
| 18 | 2-Naphthalenethiol | 2 | 0.09 | 81 |
| | 15 phm Solprene 1205 Rubber - Di-(tert-butylcyclohexyl) Peroxydicarbonate Initiation | | | |
| 19 | Benzyl mercaptan | 0.6 | 2.01 | 77 |
| 20 | Benzyl mercaptan | 0.7 | 11.2 | 66 |
| 21 | Benzyl mercaptan | 0.8 | 21.6 | 56 |
| 22 | tert-Dodecyl mercaptan | 2 | 0.05 | 71 |
| 23 | Thiophenol | 1 | 0.01 | 69 |
| 24 | n-Dodecyl mercaptan | 1 | 0.69 | 70 |

As shown in Table I, the melt flow of polymers produced through the use of the aralkyl modifiers of the invention in Runs 1, 2, 3, 7, 13, 19, 20 and 21 was much greater than that of control Runs 4, 5, 6, 8, 9, 10, 11, 12, 14, 15, 16, 17, 18, 22, 23, and 24 illustrating that polymers produced through the use of prior art mercaptans n-dodecyl mercaptan, tert-dodecyl mercaptan, tert-octyl mercaptan, thiophenol, p-toluenethiol, or 2-naphthalenethiol, even when the benzyl mercaptan or 2-phenylethyl mercaptan modifier of the invention was used at the same concentration and often even when used at lower concentration than the other mercaptans. The use of the aralkyl mercaptans resulted in polymers of better processibility than were obtained in the control runs. The use of aralkyl mercaptans resulted in polymers of better processibility, and which exhibit excellent barrier properties.

The polymers produced by the process of this invention have a variety of uses. For example, they can be used in adhesive compositions such as hot melt adhesives or solvent cements, the polymers derived from use of the larger amounts of rubber in the graft polymerization process being preferred for such applications. Polymers produced through use of relatively high ratios of nitrile monomer in one range of nitrile monomer to rubber and other monomers are particularly useful as barrier resins, e.g., in the form of films or bottles employed in packaging. The resins of lower nitrile content within our nitrile range are especially useful as engineering plastics.

Reasonable variations and modifications of our invention are possible while still within the scope of our disclosure, and without departing from the intended scope and spirit thereof, as detailed in our specification and the claims appended.

We claim:

1. In a graft polymerization solution polymerization process for preparing a nitrile polymer which comprises polymerizing at least one polymerizable vinylnitrile monomer which is an alpha, beta-olefinically unsaturated nitrile in the presence of at least one unsaturated elastomer characterized as having sufficient unsaturation to be vulcanizable and in the presence of a free radical polymerization initiator under free radical polymerization conditions employing as said molecular weight modifier at least one aralkyl mercaptan characterized as a hydrocarbyl aralkyl mercaptan containing one benzene nucleus as the aromatic ring, wherein said aralkyl mercaptan is represented by

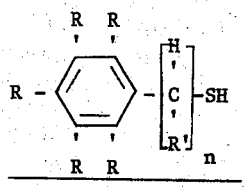

wherein each R is individually selected from hydrogen or a hydrocarbyl radical such that at least four R groups are hydrogen, R' is hydrogen, methyl, or ethyl, and n is an integer of 1 or 2, wherein said process employs said vinylnitrile and said unsaturated rubber in proportions sufficient such that said nitrile polymer contains about 18 to 95 weight percent derived from said polymerizable vinylnitrile monomer and about 5 to 50 weight percent derived from said unsaturated elastomer, and wherein said process can employ an olefinically unsaturated monomer which is vinylidine or substituted-vinylidine group containing monomer other than said alpha,beta-unsaturated nitrile and copolymerizable with said alpha,beta-unsaturated nitrile, such that the resulting nitrile polymer contains 0 to 75 weight percent derived from said olefinically unsaturated monomer.

2. The process according to claim 1 wherein each R or hydrocarbyl is 1 to 6 carbon atoms per radical.

3. The process according to claim 2 wherein said aralkyl mercaptan is benzyl mercaptan, 2-phenylethyl mercaptan, 2-phenylpropyl mercaptan, 1-methyl-2-o-tolylbutyl mercaptan, 3-ethylbenzyl mercaptan, 4-isopropylbenzyl mercaptan, 1-(2-butylphenyl)ethyl mercaptan, 1-ethyl-2-(4-hexylphenyl)butyl mercaptan, 3-cyclohexylbenzyl mercaptan, 2-(4-cyclopentylphenyl)ethyl mercaptan, or mixture.

4. The process according to claim 1 wherein said nitrile polymer contains 18 to 85 weight percent copolymerized vinyl nitrile, about 7 to 30 weight percent grafted unsaturated rubber, and about 4 to 70 weight percent derived from said olefinically unsaturated comonomer.

5. The process according to claim 1 wherein said free radical initiator is an azo, peroxy, or redox initiator system.

6. The process according to claim 5 wherein said free radical initiator is azo-bisisobutyronitrile, benzoyl peroxide, isopropylperoxydicarbonate, di-(tert-butylcyclohexyl)peroxy dicarbonate, potassium persulfate, or potassium persulfate-sodium bisulfide.

7. The process according to claim 5 wherein said polymerization process employs said free radical initiator in an amount sufficient to provide about 0.01 to 10 parts by weight of said initiator per 100 parts by weight of total monomer.

8. The process according to claim 7 wherein said polymerization conditions include a polymerization temperature of about 0° C. to 100° C., a polymerization time of up to about 48 hours, and a polymerization pressure sufficient to maintain reactants substantially in the liquid phase.

9. The process according to claim 1 wherein said alpha,beta-olefinically unsaturated nitrile can be represented by

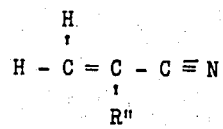

wherein R'' represents hydrogen, alkyl group of up to 4 carbon atoms, or halogen.

10. The process according to claim 9 wherein said alpha,beta-olefinically unsaturated nitrile is acrylonitrile, methacrylonitrile, alpha-chloroacrylonitrile, alpha-fluoroacrylonitrile, ethacrylonitrile, butacrylonitrile, or mixture of two or more of these.

11. The process according to claim 6 wherein said olefinically unsaturated comonomer can be represented by $$R^3 - C = C - R^5$$
$$\phantom{R^3 - C}H \phantom{=} R^4$$

in which $R^3$ represents hydrogen or

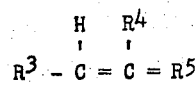

$R^4$ represents hydrogen, methyl,

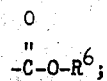

or chlorine;

$R^5$ represents aryl, such as phenyl, biphenylyl, or naphthyl, alkaryl such as tolyl,

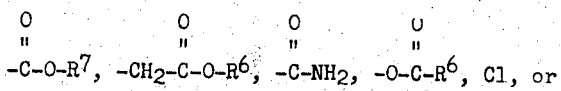

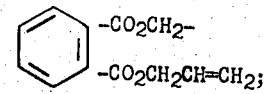

$R^6$ represents an alkyl radical of 1 to 4 carbon atoms; and $R^7$ represents hydrogen, or an alkyl radical of 1 to 12 carbon atoms which can be further substituted with a cyano group.

12. The process according to claim 11 wherein said olefinically unsaturated comonomer is styrene, alpha-methylstyrene, alpha,p-dimethylstyrene, 4- vinylbiphenyl, 2-vinylnaphthalene, methyl acrylate, ethyl acrylate, isopropyl acrylate, butyl acrylate, octyl acrylate, dodecyl acrylate, beta-cyanoethyl acrylate; methyl methacrylate, ethyl methacrylate, butyl methacrylate, hexyl methacrylate, octyl methacrylate, dodecyl methacrylate, beta-cyanoethyl methacrylate; acrylic acid, methacrylic acid, dimethyl itaconate, diethyl itaconate, dibutyl itaconate, dimethyl fumarate, dimethyl maleate, diethyl fumarate, diethyl maleate, dibutyl fumarate, dibutyl maleate, acrylamide, methacrylamide, vinyl acetate, vinyl propionate, vinyl butyrate, vinyl chloride, vinylidene chloride, diallyl phthalate, or mixtures of two or more thereof.

13. The process according to claim 6 wherein said unsaturated elastomer characterized as vulcanizable is a natural or synthetic polymer, and where synthetic is random, block, branched block, homopolymer, or copolymer.

14. The process according to claim 13 wherein said rubbery polymer is a synthetic elastomer and is a conjugated diene polymer.

15. The process according to claim 14 wherein said conjugated diene polymer is a homopolymer, copolymer of two or more conjugated dienes, or copolymer of at least one conjugated diene with at least one copolymerizable monomer wherein said copolymerizable monomer is a monovinyl-substituted aromatic compound, alpha,beta-olefinically unsaturated nitrile, or 1-monoolefin monomer.

16. The process according to claim 15 wherein said conjugated diene contains 4 to 12 carbon atoms per molecule, said monovinyl-substituted aromatic compound contains 8 to 20 carbon atoms per molecule, and said 1-monoolefin contains 2 to 8 carbon atoms per molecule.

17. The process according to claim 16 wherein said conjugated diene is 1,3-butadiene, isoprene, piperylene, 2,4-dimethyl-1,3-butadiene, 1,3-octadiene, 4,5-diethyl-1,3-octadiene; said monovinyl-substituted aromatic compound is styrene, ethyl styrene, or halo styrene; said alpha,beta-olefinically unsaturated nitrile is acrylonitrile or methacrylonitrile; and said 1-monoolefin is ethylene, propylene, or 1-octene.

18. The process according to claim 13 wherein said unsaturated elastomer is cis-polybutadiene, emulsion polybutadiene, vinyl polybutadiene, cis-polyisoprene, natural rubber, GRS rubber, butadiene/styrene copolymer, butadiene/acrylonitrile copolymer, ethylene/propylene conjugated terpolymer, partially hydrogenated polybutadiene or butadiene/styrene copolymer, branched block copolymer, branched with a polyvinyl aromatic compound or with a silicone polyhalide.

19. The process according to claim 17 wherein said unsaturated elastomer is a butadiene/styrene block copolymer containing a weight ratio of about 75/25 copolymerized butadiene/styrene.

20. The process according to claim 19 wherein said alpha,beta-olefinically unsaturated nitrile is acrylonitrile, and said aralkyl mercaptan is benzyl mercaptan.

21. The process according to claim 19 wherein said alpha,beta-olefinically unsaturated nitrile is acrylonitrile, and said aralkyl mercaptan is 2-phenylethyl mercaptan.

* * * * *

UNITED STATES PATENT OFFICE
CERTIFICATE OF CORRECTION

Patent No. 3,859,388  Dated January 7, 1975

Inventor(s) H. Wayne Hill, Jr., et al.

It is certified that error appears in the above-identified patent and that said Letters Patent are hereby corrected as shown below:

Claim 19, line 1, delete "17" and insert -- 13 --.

Signed and sealed this 15th day of April 1975.

(SEAL)
Attest:

RUTH C. MASON
Attesting Officer

C. MARSHALL DANN
Commissioner of Patents
and Trademarks